United States Patent [19]
Mead

[11] 3,772,083
[45] Nov. 13, 1973

[54] BATTERY CELL CONSTRUCTION
[75] Inventor: Ralph T. Mead, Kenmore, N.Y.
[73] Assignee: The Wurlitzer Company, Chicago, Ill.
[22] Filed: May 1, 1972
[21] Appl. No.: 248,975

[52] U.S. Cl.................. 136/20, 136/83 R, 136/111
[51] Int. Cl. .......................................... H01m 43/00
[58] Field of Search...................... 136/20, 24, 107, 136/83 R, 111, 14, 6 A, 133, 169–170, 143–146

[56] References Cited
UNITED STATES PATENTS
| | | | |
|---|---|---|---|
| 2,571,616 | 10/1951 | Ruben | 136/7 |
| 2,942,054 | 6/1960 | Jeannin | 136/83 |
| 2,977,401 | 3/1961 | Marsal et al. | 136/120 R |
| 3,310,436 | 3/1967 | Ralston et al. | 136/20 X |
| 3,438,812 | 4/1969 | Cherney et al. | 136/20 X |

*Primary Examiner*—Anthony Skapars
*Attorney*—Roy H. Olson et al.

[57] ABSTRACT

A battery cell construction is disclosed which has a cathode structure formed of a compound containing either silver or silver oxide and may include mercury oxide. An anode is formed of a compound containing cadmium and nickel. The nickel can be a sheet or screen formed into a spiral or fibers pressed into a pellet with the cadmium. A separator containing electrolyte material is positioned between the cathode and anode compounds. The separator includes alternate layers of ion exchange membranes of two types to provide minimum migration of silver ions.

12 Claims, 6 Drawing Figures

PATENTED NOV 13 1973 3,772,083
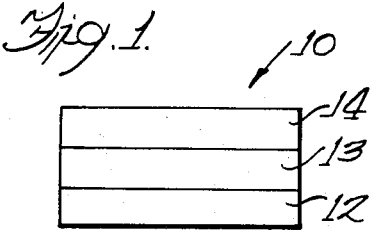
Fig.1.
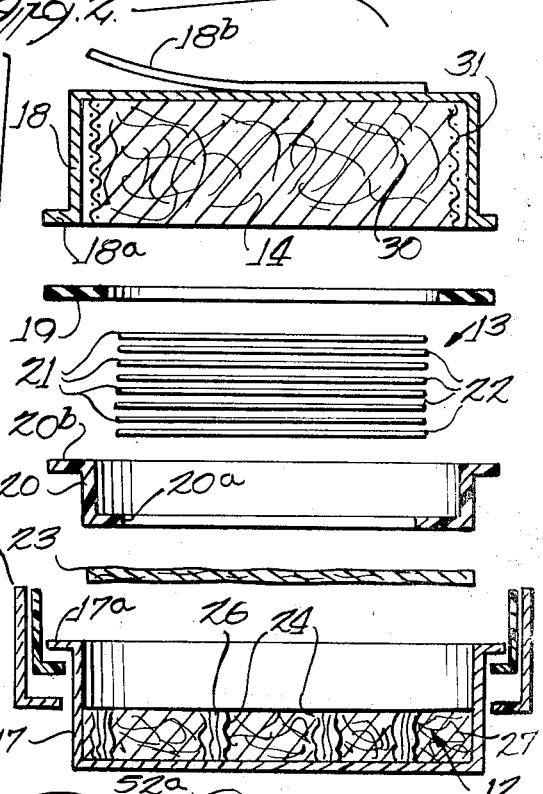
Fig.2.
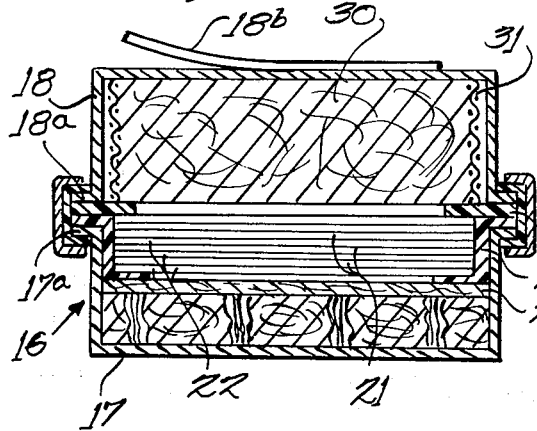
Fig.3.
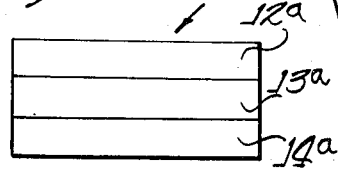
Fig.4.
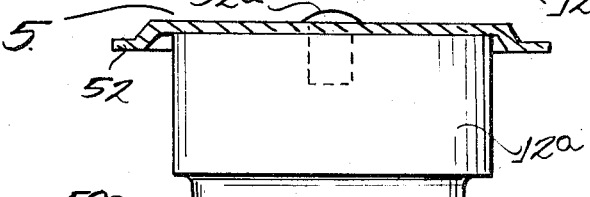
Fig.5.
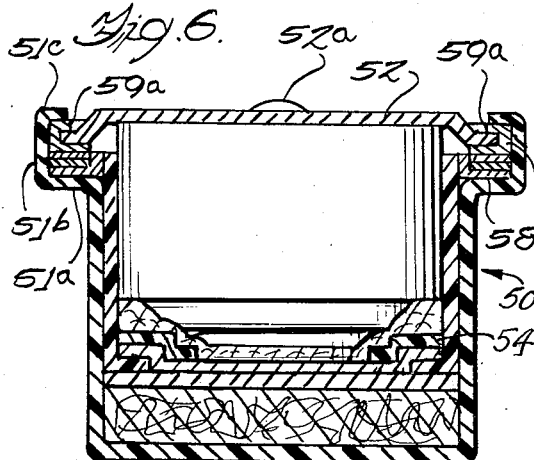
Fig.6.
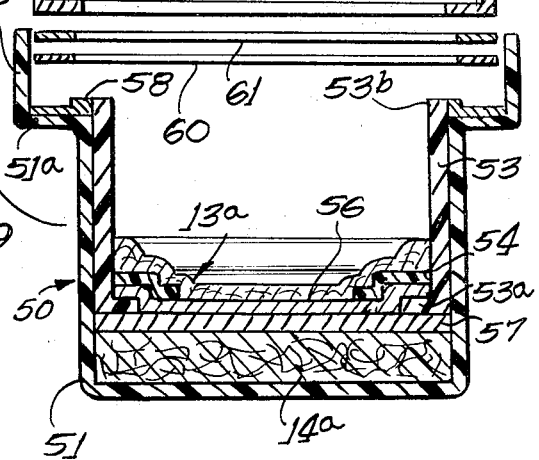

BATTERY CELL CONSTRUCTION

BACKGROUND OF THE INVENTION

This invention relates generally to a battery cell construction, and more particularly to a battery cell construction which can be used for implantation into the human body to operate an electronic device such as a heart stimulating pacemaker or the like.

Electronic devices for implantation into the human body are relatively well known. Such electronic devices may include pulsing circuits commonly referred to as heart pacemakers which electronically stimulate the heart at regular intervals or automatically provide a stimulating pulse upon sensing that the heart has not produced its own electromuscular pulse.

Electronic devices such as the pacemaker are dependent on battery power supplies to provide the necessary energization of the electronic circuitry therein and to provide the stimulating pulse to the heart. The power supplies used generally are small battery cells either singularly or a plurality of such battery cells are connected in parallel or series to increase the voltage or current delivered to the electronic device. Such battery cells must provide power for a relatively long period of time such as one year or more while the unit is implanted in a person's body. Many battery cells heretofore utilized for such purpose have encountered problems which have caused premature failure of the electronic device, a condition which is fatal to the person using it. For example, a catastrophic failure of the battery cell almost always produces a condition that kills the patient before a new pacemaker or battery cell can be put in its place. When replacing a battery cell of this general type it must be fresh, with minimum decay during shelf life, before it is used. Also, the battery cell must have a predictable life expectancy so that the person using it can know when to replace the unit.

SUMMARY OF THE INVENTION

Briefly, the battery cell construction of this invention utilizes a cathode formed of a compound of silver or silver oxide which compound may include mercury oxide in an amount of up to 95 percent by weight. A potassium hydroxide electrolyte solution, or the like, is provided in a separator layer having alternate layers of two different kinds of separator material. The anode composition used in the battery cell is foremd of a combination of cadmium and nickel. The nickel can take any form such as a nickel sheet or screen or it can be nickel fibers mixed with the cadmium to form a pellet. In one embodiment of this invention the battery cell has a housing formed of first and second housing portions which are cup shaped. Annular flanges are formed about each of the open ends of the cup shaped portions and they are clamped together by a rolled over ring which is insulated therefrom by teflon or the like which also acts as a seal. The quantity of electrolyte solution, preferably potassium hydroxide, can be selected so as to be depleted before either the anode or cathode compounds are depleted. By so controlling the quantity of electrolyte solution, the battery cell will become a high resistance element at the end of its usable life and thereby substantially reduce the possibility of catastrophic failure due to short circuit between the anode and cathode elements. Also, by controlling the amount of electrolyte solution the battery cell will not produce a reverse voltage condition at the end of its usable life.

Many objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a simplified schematic showing of one form of battery cell construction of this invention;

FIG. 2 is an exploded view of one form of battery cell of this invention;

FIG. 3 is an assembled, cross sectional view of the battery cell of FIG. 2;

FIG. 4 is a schematic showing of an alternate form of battery cell construction of this invention;

FIG. 5 is an exploded view of the battery cell of FIG. 4; and

FIG. 6 is an assembled, cross sectional view of the battery cell of FIG. 5.

DETAILED DESCRIPTION OF THE ILLUSTRATED EMBODIMENTS

Referring to FIG. 1 there is seen a simplified diagrammatic representation of a battery cell constructed in accordance with the principles of this invention and is designated generally by reference numeral 10. The battery cell 10 includes an anode structure 12 formed of a mixture containing cadmium and nickel. The nickel can be in any suitable form, such as rolled sheets, screening or nickel fiber mixed with cadmium or cadmium oxide and pressed together. The nickel then serves as a good electrical contact with a housing portion which forms the outer anode electrode of the battery cell. A separator element 13 forms an electrolyte solution holding layer which includes electrolyte solution such as potassium hydroxide, or the like. The separator layer 13 is formed of alternate layers of two different types of thin membrane elements to be described hereinbelow. A cathode layer 14 is formed of a composition containing silver or silver oxide which may include mercury oxode mixed therewith. Where mercury is utilized in the cathode composition, it may be in an amount of between 5 and 95 percent by weight, depending on the characteristics desired. By forming a battery cell in accordance with this invention, i.e. a mixture of cadmium oxide and nickel metal, it will provide approximately 85 to 90 percent utilization of the cadmium to thereby enable a more compact anode configuration for a given current density.

Referring now to FIGS. 2 and 3 there is seen a specific embodiment of a battery cell constructed in accordance with this invention. Here a housing 16 is formed of two housing portions 17 and 18 forming the anode and cathode outer electrodes, respectively. A ring 19, of insulating material, has an outer diameter equal to the extent of radially outwardly turned flanges 17a and 18a of their respective body portions. The body portions, when brought together, are then held spaced apart by the insulating ring 19.

A separator housing 20 has an aparture 20a formed therein and a radially outwardly turned flange 20b which also corresponds to the radial dimension of the flanges 17a and 18a. The housing 20 is somewhat cylindrical in configuration having an inner diameter which is greater than the outer diameter of the insulating ring 19. Therefore, when a plurality of alternate layers of different kinds of electrolyte absorbing membranes 21 and 22 are positioned in the housing 20 they are embraced about their periphery by the bottom housing wall and the top ring 19. The alternate layers 21 and 22 of different kinds of material are selected so as to provide a minimum migration of silver from the cathode structure 14 therethrough to the anode structure 12. The layers 21 are formed of a membrane filter material such as polyvinylchloride acrylonitrile copolymer. One such material is identified by the trade name ACROPOR and supplied by Gelman Instrument Company, Ann Arbor, Michigan. The layers 22 are formed of thin polyethylene material. Positioned between the separator housing 20 and the anode structure 12 is a layer of electrolyte absorbing material 23 which provides good electrical and chemical contact between the electrolyte solution and the anode structure. The electrolyte absorbing material 23 and the separator housing 20 together with its alternate layers of membrane material form the electrolyte layer 13 shown in FIG. 1.

The anode structure includes a length of nickel screen material 24, approximately 3 to 7 inches in length, folded down about each side of a corresponding length of electrolyte absorbing material. This length of nickel screen and electrolyte absorbing material is then wound in spiral fashion and inserted into the housing portion 17, preferably with the exposed terminating ends of the screen downward and the folded over portion of the screen upward toward the layer 23. This provides good electrical contact between the electrode formed by the housing portion and the inner material of the anode structure. The anode structure is then completed by filling the space between the nickel screen spiral with a compound of cadmium or cadmium oxide which is made into a pasty mix with potassium hydroxide which also forms the electrolyte solution of the battery. In one preferred embodiment the electrolyte is 50% potassium-hydroxide.

The cathode structure is preferably a slug or pellet 30 of silver or silver oxide which may contain a quantity of mercury oxide therein. The cathode structure 30 is pressed into the housing portion 18 and makes good electrical contact therewith by the provision of an annular screen 31. The housing portion 18 may include a resilient contact element 18b for making electrical connection therewith with an external circuit.

FIG. 4 illustrates a diagrammatic representation of an alternate form of battery cell in accordance with this invention and is designated generally by reference numeral 10a. The battery cell 10a includes an anode 12a formed of a composition of material containing cadmium and nickel fibers which are compressed into a pellet configuration. An electrolyte solution of potassium hydroxide or the like forms the separator layer 13a. The cathode 14a is formed of a composition of material containing mercury oxide and silver or silver oxide. In this instance the silver is in a quantity less than that of the mercury and preferably in the order of about 10 percent by weight.

Referring now to FIGS. 5 and 6 there is shown the details of construction of a battery cell corresponding to the schematic representation of FIG. 4. Here a housing 50 is formed of a cup shaped member 51 and a cover plate 52. The anode pellet structure 12a is secured to the cover plate 52 by forming the pellet onto a shaft, such as a rivet or screw or the like, so that the pellet is in good electrical and mechanical contact with the cover plate 52. The separator layer 13a is formed between a liner 53 which has a radially inwardly turned flange 53a and a securing ring 54 inserted therein. The securing ring 54 applies outward pressure on the liner and seals it against the inner wall of the housing so that hydrogen gases produced during discharge will not pass through the liner and come in contact with the nickel cathode housing. The pressure ring 54 has a configuration such that a quantity of fibrous material 56 will extend therethrough and be in contact with a separator layer 13a which is in contact with fibrous layer 57. The fibrous layers 56 and 57 are provided with the electrolyte solution, and the quantity of the electrolyte solution can be such as to become substantially depleted before either the anode or cathode materials are depleted. This insures that at the end of battery life the battery will have a high internal resistance. The configuration of the presssure ring 54 in the fibrous material 56 in contact therewith corresponds substantially to the configuration of the bottom portion of the pellet 12a so that a maximum surface area of the anode is in contact with electrolyte solution. Positioned beneath the fibrous layer 57 is a quantity of cathode forming material 14a. Here the cathode can be poured or laid into the housing 51 and pressed in position.

In the assembly of the battery cell of FIGS. 5 and 6 the cup shaped housing portion 51 has radially outwardly turned flange portions 51a which are contiguously formed with upwardly turned portions 51b. The insulating sleeve 53 has the uppermost edge 53b thereof extending slightly beyond the flange portion 51a. An insulating ring 58 is inserted upon the flange portion 51a and in contact with the upper edge of the liner 53. A second insulating member 59, which is L-shaped in the cross section, is positioned on top of the flange and the flange is rolled over but completely insulated from the top plate 52 by the top edge 59a of the insulating member 59. To insure proper insulation and spacing of the top plate 52 with that of the rolled over flange portions 51a and 51b a pair of insulating rings 60 and 61 are positioned between the insulating members 58 and 59. Ring 58 serves as a retainer for rings 60 and 61.

While several embodiments of the present invention have been illustrated herein it will be understood that still further variations and modifications may be effected without departing from the spirit and scope of the novel concepts disclosed and claimed herein.

The invention is claimed as follows:

1. A battery cell construction comprising in combination, a housing having first and second housing portions, said first housing portion being cup shaped with an annular flange formed about the open end thereof, said second housing portion being similarly cup shaped with an annular flange formed about the open end thereof, said annular flange being brought together in mating relation, an insulating ring between said flanges electrically separating the same, a cathode composition positioned in said first housing portion, said cathode composition having silver therein, a cylindrical sleeve positioned in said second housing portion near the open end thereof, said cylindrical sleeve beng formed of insulating material, electrolyte absorbing layers positioned within said cylindrical sleeve and in contact with said cathode composition, electrolyte means in said electrolyte absorbing layers, an anode composition positioned in said second housing portion, said anode composition being formed cadmium and nickel, and a retaining ring positioned about said flanges securing said first and second housing portions together.

2. The battery cell construction of claim 1 wherein said insulating ring extends radially inwardly of the inner diameter of said first and second housing portions and wherein the upper portion of said sleeve abuts against the radially inward portion of said insulating ring.

3. The battery cell construction of claim 1 wherein said sleeve includes a radially inward portion at the end opposite the end engaging said insulating ring, said radially inward portion serving to support said electrolyte absorbing layers.

4. The battery cell construction of claim 1 wherein said anode composition is formed of a spiral oriented upstanding nickel screen secured to the bottom wall of said second housing portion and a composition of cadmium and cadmium oxide powders are placed in said second housing portion between the adjacent surfaces of said spiral screen forming the anode thereof.

5. The battery cell construction of claim 4 further including a solution of 50 percent potassium hydroxide mixed with said cadmium and cadmium oxide powders.

6. The battery cell construction of claim 1 wherein the electrolyte solution is of a predetermined quantity so that during operation of the battery cell the electrolyte solution will deplete before either the cathode or anode compositions.

7. The battery cell construction of claim 1 wherein said anode structure is formed of a layer of nickel, a layer of cadmium, and a layer of electrolyte absorbing material rolled together and inserted into said second housing portion to be in contact with the bottom wall thereof and extending upwardly therefrom substantially the entire height of said second housing portion to be in contact with said electrolyte absorbing layers.

8. A battery cell construction comprising in combination, a housing formed of a cup shaped member having a flat bottom wall and circular side wall, and a radially outwardly extended flange at the upper end thereof, a cathode composition positioned within said housing and in contact with said bottom wall, said cathode composition including silver, a cylindrical sleeve positioned within said housing and in contact with the circular wall thereof, said cylindrical sleeve extending between said cathode composition and the upper end of said housing, a ring positioned inwardly of said sleeve and having an outer diameter slightly greater than the inner diameter of said sleeve forming an interference fit therewith thereby creating a seal between said sleeve and said circular wall, electrolyte means positioned within said sleeve and adjacent said ring in contact with said cathode composition, and an anode composition extending into said housing and in contact with said electrolyte means, said anode composition being formed of cadmium and nickel.

9. The battery cell construction of claim 8 further including an anode cover plate electrically connected to said anode composition and having a peripheral portion sealed and secured to the radial flange of said housing.

10. The battery cell construction of claim 9 wherein said anode composition is formed of cadmium oxide and nickel fiber and wherein said cover plate is formed of nickel and further including a nickel wire passing through said anode composition and electrically secured to said cover plate.

11. The battery cell construction of claim 8 wherein said cathode composition is formed of mercury oxide and includes silver in an amount of between 5 and 95 percent.

12. The battery cell construction of claim 8 wherein said cathode composition is formed of mercury oxide and includes silver oxide in an amount of between 5 and 95 percent by weight.

* * * * *